United States Patent

[11] 3,626,398

| [72] | Inventors | Abner Owens, Jr.<br>Paramus;<br>Arthur Simon, Fair Lawn; Kenneth J.<br>Kendall, Fairfield, all of N.J. |
|---|---|---|
| [21] | Appl. No. | 754,423 |
| [22] | Filed | Aug. 21, 1968 |
| [45] | Patented | Dec. 7, 1971 |
| [73] | Assignee | The Bendix Corporation |

[54] MULTIPLE DISPLAY SYSTEM
4 Claims, 2 Drawing Figs.

[52] U.S. Cl. .................................................. 340/183,
340/27, 340/212
[51] Int. Cl. ...................................................... G08c 15/12
[50] Field of Search........................................... 340/212,
324.1, 27, 183

[56] References Cited
UNITED STATES PATENTS

| 3,248,650 | 4/1966 | Bialkowski et al. | 340/183 |
| 3,253,161 | 5/1966 | Owen | 307/251 |
| 3,313,958 | 4/1967 | Bowers | 307/251 |
| 3,406,387 | 10/1968 | Werme | 340/212 |
| 3,474,438 | 10/1969 | Lauher | 340/212 |
| 3,502,905 | 3/1970 | Bicking | 307/251 |

*Primary Examiner*—Thomas B. Habecker
*Attorneys*—S. H. Hartz and Plante, Hartz, Smith & Thompson ABSTRACT: A multichannel electronic device providing data for displaying a plurality of actual flight conditions of an aircraft and for displaying the deviation of the actual flight conditions from the preset reference flight conditions or selected actual flight conditions, and multiplexing means for periodically displaying the data at a frequency to observe all conditions simultaneously.

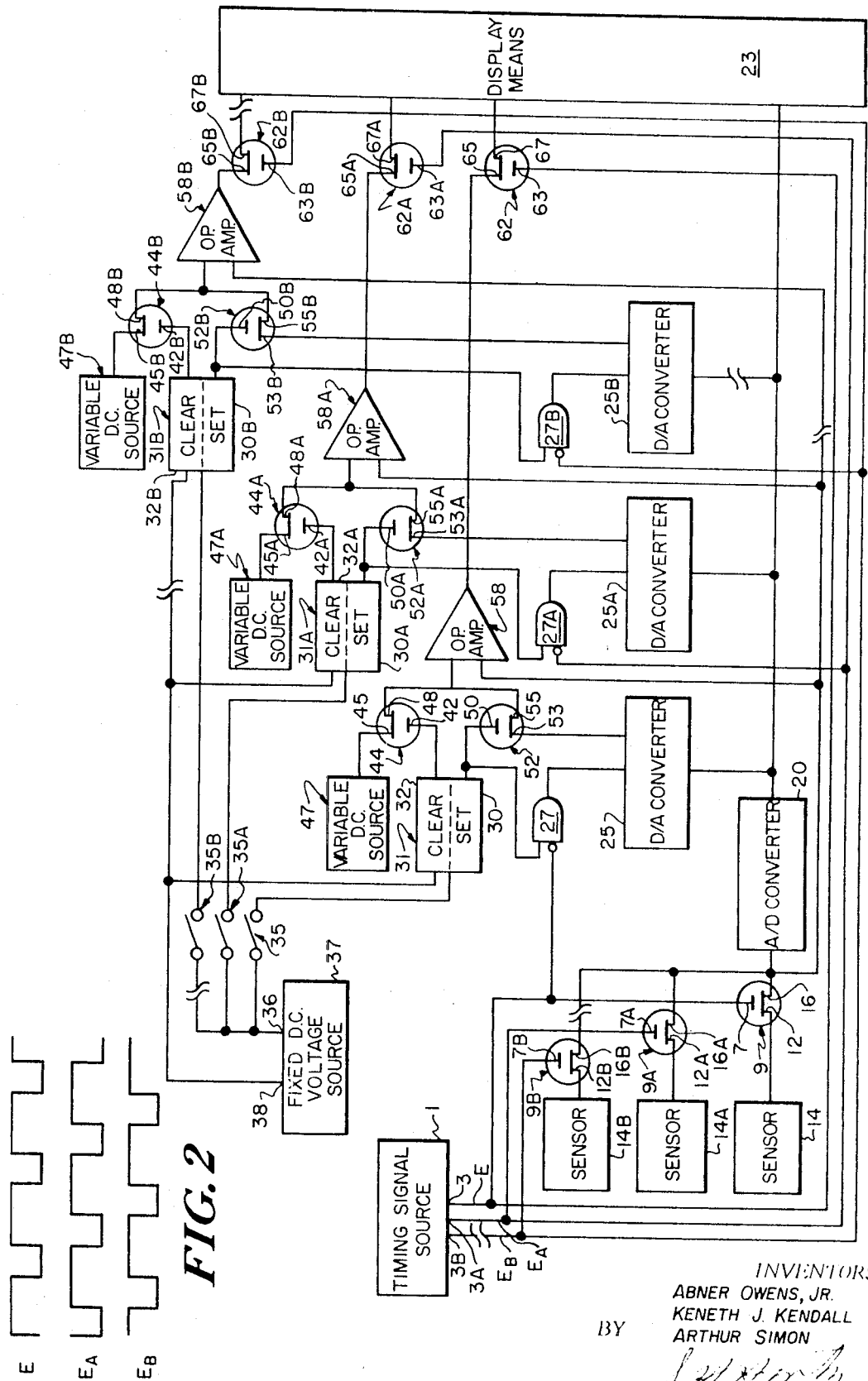

MULTIPLE DISPLAY SYSTEM

BACKGROUND OF THE INVENTION

Field of the Invention

The present invention relates to displaying information corresponding to an actual flight condition and to displaying information corresponding to deviation of the actual flight condition from a preset flight condition or from a selected actual flight condition as references.

SUMMARY OF THE INVENTION

The present invention contemplates a multiple display system for simultaneously displaying data corresponding to a present value of a condition and data corresponding to a deviation of the present value of the condition from a reference value. A sensor senses the actual condition and provides an analog signal corresponding to the present value of the condition to an analog-to-digital converter and to an operational amplifier. A digital-to-analog converter is connected to the analog-to-digital converter and converts the digital signal to an analog signal and upon a command will maintain the analog signal constant independent of changes in the digital signal. Switching means connects a variable amplitude DC voltage source and the digital-to-analog converter to the operational amplifier for passing a selected value signal from the digital-to-analog converter or a reference signal from the DC voltage source to the operational amplifier which provides an output corresponding to the difference between the condition signal and the reference signal or the selected value signal. The condition signal from the analog-to-digital converter and the output from the operational amplifier are applied to a display system for the simultaneous displaying of the information relating to the present value of the condition and to the difference between the present value of the condition and the reference value or the selected value of the condition.

One object of the invention is to display data corresponding to actual flight conditions and to the differences between actual flight conditions and reference conditions.

Another object of the invention is to provide a selection between preset reference flight conditions and actual flight conditions selected and stored while in flight as reference conditions.

Another object of the invention is to selectively store data corresponding to actual flight conditions for an indefinite time without deterioration of the data.

Another object of the invention is to use only electronic components so as to achieve high reliability and low bulk, weight and power consumption.

Another object of the invention is to provide simultaneous displays of several flight conditions and their differences from reference condition.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 1 is a schematic circuit diagram of a preferred embodiment of the present device in which corresponding parts of several channels have been indicated by like numerals bearing the suffix "A" and "B" to indicate respective parts of the several channels. The quantity of channels indicated in FIG. 1 are reduced in number so as not to confuse the drawing with undue multiplicity of elements. The breaks, with respect to the channel having the suffix "B,[ are intended to show that the channels of circuit arrangements in excess of the number illustrated may be introduced within the broken portion by simple extrapolation of the circuits illustrated.

FIG. 2 is a graphical representation of the waveforms of three voltages E, $E_A$ and $E_B$ provided by the timing signal source.

DESCRIPTION OF THE INVENTION

Referring to FIG. 1, there is shown a timing signal source 1 providing electrical timing pulses E, $E_A$ and $E_B$, time-related as shown in FIG. 2, at terminals 3, 3A and 3B, respectively. A gate element 7 of an MOS field effect transistor 9 is connected to terminal 3 and receives the pulse E. The MOS field effect transistor 9 has a source element 12 connected to a sensor 14 and a drain element 16. Sensors 14, 14A and 14B sense actual flight condition of an aircraft in flight and provides corresponding analog outputs. MOS field effect transistors 9, 9A and 9B in response to the outputs of the timing signal source selects sensor 14, 14A or 14B to have its output processed and displayed. Prior to the pulse E, the output of sensor 14 present at source element 12 is blocked by high internal resistance between source element 12 and drain element 16. Pulse E causes the internal resistance to be reduced thereby passing the output of sensor 14 to drain element 16 of field effect transistor 9.

An analog-to-digital converter 20 which may be of the type manufactured by Pastoriza Electronics and identified by their part number ADC–12 has an input connected to drain element 16 and converts the output of sensor 14 that appears at drain element 16 to a digital signal. A display means 23 of the type having a cathode-ray tube is connected to the converter 20 and provides a display on the face of the cathode-ray tube relating to the actual flight condition in response to the digital signal.

A digital-to-analog converter 25 which may be of the type manufactured by Pastoriza Electronics and identified by their part number DAC–12 has a first input connected to the output of analog-to-digital converter 20 and converts the digital signal from converter 20 to an analog signal.

An AND-gate 27 has an inverting input connected to gate element 7 so that negative pulse E applied to gate element 7 of the MOS field effect transistor 9 is inverted and enables AND-gate 27 for the duration of pulse E. A noninverting input to AND-gate 27 is connected to a set section 30 of a flip-flop 31 so that the state of the flip-flop 31 controls the AND-gate 27. AND-gate 27 provides a high level DC output when set section 30 provides a high level DC output and the pulse E is present at terminal 3 of timing signal source 1. The output of AND-gate 27 is applied to a second input of digital-to-analog converter 25. Digital-to-analog converter 25 will convert the output of converter 20 to analog signals when a high level DC output from the AND-gate is received. Converter 25 is inhibited when pulse E is not present at terminal 3 of timing signal source 1 to avoid applying data from sensors 14A and 14B to converter 25. The inhibiting of converter 25 by the absence of pulse E permits flip-flop 31 to change state at any time; when flip-flop 31 requires converter 25 to be inhibited, converter 25 would either be converting a digital signal related to the output of sensor 14 or storing data from the last conversion of the digital signal relating to the output of sensor 14.

A toggle input to the flip-flop 31 is connected to a switch 35 which in turn is connected to a terminal 36 of a source of fixed DC voltage 37. Switch 35 may be a conventional single-pole single-throw toggle switch but preferably it is a momentary "on" push button switch. Switch 35 controls the state of the flip-flop 31. The fixed DC voltage source 37 provides DC voltage at terminal 36 and a pulse at a terminal 38. An input to a clear section 32 of flip-flop 31 is connected to terminal 38 of fixed DC voltage source 37. The pulse at terminal 38 only occurs when the voltage source 37 is initially turned on and it clears all the flip-flops at that time. Activation of the switch 35 causes flip-flop 31 to change from one state to a second state. A second activation of switch 35 causes flip-flop 31 to change back to the first state.

Clear section 32 of flip-flop 31 is connected to a gate element 42 of a MOS field effect transistor 44 having a source element 45 connected to the output from a variable amplitude DC voltage source 47 and a drain element 48. A low level DC output from clear section 32 causes low internal resistance in transistor 44 thereby passing the output from the variable amplitude DC voltage present at source element 45 to drain element 48. The variable DC voltage source may be of a type in which a specific flight condition may be preset by adjusting a dial to provide a change in the voltage level. The output of set section 30 of flip-flop 31 is also connected to a gate element 50 of a MOS field effect transistor 52 having a source element 53 connected to digital-to-analog converter 25 and a drain element 55 connected to drain element 48 of MOS field effect transistor 44. A low level DC voltage from set section 30 causes a reduced resistance between source element 53 and drain element 55 of MOS field effect transistor 52 permitting the output from digital-to-analog converter 25 to pass through to drain element 55 and at the same time inhibits converter 25.

An operational amplifier 58 has one input connected to drain elements 48 and 55 of MOS field effect transistors 44 and 52, respectively, and a second input connected to drain element 16 of the MOS field effect transistor 9. Operational amplifier 58 compares either the output from variable amplitude DC voltage source 47 present at drain element 48 or the output from digital-to-analog converter 25 present at drain element 55, depending on the state of flip-flop 31, with the output from sensor 14 present at drain element 16 of MOS field effect transistor 9. The occupant of the aircraft can select either the output of digital-to-analog converter 25 or the output of variable amplitude DC voltage source 47, which is preset, by activation of switch 35. Operational amplifier 58 provides an output relating to the difference between the output from sensor 14 and the selected output from either digital-to-analog converter 25 or the variable amplitude DC voltage source 47.

A MOS field effect transistor 62 has a gate element 63 connected to gate element 7 of MOS field effect transistor 9, a source element 65 connected to the output of operational amplifier 58 and a drain element 67 connected to display means 23. MOS field effect transistors 62, 62A and 62B in cooperation with MOS field effect transistors 9, 9A and 9B passes the output of operational amplifier 58, 58A or 58B to display means 23 simultaneously with the passing of the output of sensors 14, 14A or 14B, respectively, to display means 23 so that the output from a particular operational amplifier is available for display simultaneously with data related to the output from a sensor associated with that particular operational amplifier. The pulse E at terminal 3 of timing source 1 is simultaneously applied to gates 7 and 63 of MOS field effect transistors 9 and 62, respectively, causing MOS field effect transistor 62 to pass the output from operational amplifier 58 present at source element 65 to drain element 67 simultaneously with the passing of the sensed condition signal from sensor 14 to drain element 16 of MOS field effect transistor 9. Display means 23 provides a display corresponding to the difference between the actual flight condition and a reference flight condition as provided by either inhibiting digital-to-analog converter 25 or presetting the variable DC voltage source 47 while providing another display relating to the actual flight condition of the aircraft as sensed by sensor 14 due to the input from the analog-to-digital converter 20.

Corresponding elements having the same numeric designation are connected and function in the same manner as heretofore described. All the elements having the same suffix form a channel. It should be noted that the analog-to-digital converter 20 is common to all channels and as such its input is also connected to the drain elements 16A and 16B of MOS field effect transistors 9A and 9B, respectively, and its output is also connected to first inputs of digital-to-analog converters 25A and 25B.

The frequency of applying the outputs from a channel to display means 23 is determined by the persistence of vision of a viewer and to the retentivity of the display means 23. For example, if display means 23 has no retentivity, then the outputs from each channel should be displayed approximately 50 to 60 times per second, or more, for continuity of vision to a viewer. If display means 23 includes a cathode-ray tube having an inherent retentivity due to the phosphorus coating on the face of the tube, the outputs from each channel should be applied approximately 30 to 40 times per second, or more. If display means 23 includes a storage tube, due to the long retentivity of the tube, the outputs from each channel may be applied at a lesser frequency. In the system heretofore described, display means 23 includes a cathode-ray tube so that pulses E, $E_A$ and $E_B$ from timing signal source 1 apply the outputs from each channel to display means 23 forty times per second.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. Condition responsive means comprising:
   a sensor for sensing a condition and for providing an analog signal corresponding thereto;
   an analog to digital converter connected to the sensor for converting the analog condition signal to a digital signal;
   control means connecting the analog to digital converter to the sensor for applying the analog condition signal to the converter;
   a signal source for providing a reference signal;
   a digital to analog converter connected to the analog to digital converter for converting the digital signal to an analog signal;
   selection means connected to the signal source and to the digital to analog converter and operable for passing one of the analog and reference signals;
   comparator means connected to the sensor and to the selection means for comparing the condition signal and the signal passed by the selection means, and for providing a signal corresponding to the difference therebetween; and
   utilizing means connected to the analog to digital converter and to the comparator for utilizing the signals therefrom to provide information relating to the condition.

2. Condition responsive means as described by claim 1, including:
   means for providing a timing pulse; and
   the control means connected to the timing pulse means and rendered operative for applying the analog condition signal to the converter only when the timing pulse is present.

3. Condition responsive means as described by claim 1, wherein the utilizing means includes:
   display means for simultaneously displaying the condition and the difference between the one of the analog and reference signals.

4. Condition responsive means as described by claim 1, comprising means responsive to a plurality of conditions, said means including:
   a corresponding plurality of channels with the analog to digital converter being common to all of the channels and each channel having a condition sensor, control means, a signal source, a digital to analog converter, selection means and comparator means; and
   multiplexing means for periodically connecting the utilizing means to the analog to digital converter and to one of the comparators for utilizing the signals therefrom to provide information relating to all of the plurality of conditions.

* * * * *